(12) United States Patent
Hammond et al.

(10) Patent No.: US 7,509,802 B2
(45) Date of Patent: Mar. 31, 2009

(54) DRIVE UNIT FOR HYBRID ELECTRIC VEHICLE

(75) Inventors: Matthew D. Hammond, Dearborn, MI (US); Michael T. Berhan, Sylvania, OH (US); Jeffrey E. Maurer, Commerce, MI (US); Steve G. Thomas, Bloomfield Hills, MI (US); Julie A. Sunstein, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 392 days.

(21) Appl. No.: 11/527,076

(22) Filed: Sep. 26, 2006

(65) Prior Publication Data

US 2008/0072586 A1 Mar. 27, 2008

(51) Int. Cl.
*F16D 33/00* (2006.01)
(52) U.S. Cl. ............................ 60/330; 903/915; 903/951
(58) Field of Classification Search .................... 60/330, 60/338, 345, 366; 180/65.2; 903/915, 951, 903/952
See application file for complete search history.

(56) References Cited

U.S. PATENT DOCUMENTS

| | | | |
|---|---|---|---|
| 6,217,476 B1 * | 4/2001 | Muller et al. | 903/951 |
| 6,258,001 B1 * | 7/2001 | Wakuta et al. | 903/951 |
| 6,340,339 B1 | 1/2002 | Tabata et al. | |
| 6,478,101 B1 | 11/2002 | Taniguchi et al. | |
| 6,720,696 B2 | 4/2004 | Berhan | |
| 6,777,837 B2 | 8/2004 | Tsuzuki et al. | |
| 6,781,272 B2 | 8/2004 | Kahlon et al. | |
| 2003/0057004 A1 | 3/2003 | Morishita et al. | |
| 2004/0045752 A1 | 3/2004 | Omote et al. | |
| 2004/0130225 A1 | 7/2004 | Mencher et al. | |
| 2005/0207915 A1 * | 9/2005 | Fledersbacher et al. | 417/410.1 |

* cited by examiner

*Primary Examiner*—Michael Leslie
(74) *Attorney, Agent, or Firm*—David B. Kelley; MacMillan, Sobanski & Todd, LLC

(57) ABSTRACT

An apparatus for supporting an electric power source in a transmission includes a transmission housing, and an electric machine including a rotor and a stator secured to the housing. A first member is secured to the rotor, extends radially toward an axis of rotation, and is formed with a first pilot surface. A second member, secured to the rotor and the housing, extends from the housing toward the axis and is formed with a second pilot surface that is aligned axially with the first pilot surface. An anti-friction bearing, located at an axial rearward side or axially frontward side of a torque converter, is engaged with the first pilot surface and the second pilot surface. A second balanced bearing is located either in the driving engine or the driven transmission.

12 Claims, 4 Drawing Sheets

DRIVE UNIT FOR HYBRID ELECTRIC VEHICLE

BACKGROUND OF THE INVENTION

The present invention relates generally to a drive assembly for transmitting power to an automotive power transmission from two power sources. In particular, it pertains to an assembly for driveably connecting an internal combustion (IC) engine and an electric machine to a transmission input.

Hybrid vehicles generally have two power sources, a conventional internal combustion engine, and an alternate power source, such as an electric machine. The electric machine is used as a power source in city driving where vehicle kinetic energy can be recovered by regenerative braking, converted to electric and chemical form, and stored in a battery, from which the motor is driven. The internal combustion is most suitable in highway driving, during which wheel braking and opportunities for energy recovery are infrequent, and the engine operates at its greatest efficiency.

In mixed driving conditions, the electric machine and IC engine may be used together to transmit power to a transmission input shaft, depending on the driving conditions and the magnitude of reserve battery capacity. A compact assembly for alternately combining the output of each power source or connecting them individually to the transmission input, while making efficient use of the radial and axial dimensions of the assembly, is a long sought need in the industry.

The electric machine may be an integrated starter generator (ISG), also known as a combined starter generator, combined starter alternator, or a motor-generator. In a hybrid electric vehicle the ISG assembly may be mounted in line with the engine crankshaft and the vehicle's transmission. In order to provide for proper electromagnetic and dynamic characteristics, energy recovery, thermal properties, packaging dimensions, assembly, and servicing, the ISG powertrain must be carefully designed so that no component impairs the function of another component or of the vehicle.

SUMMARY OF THE INVENTION

A drive assembly for supporting an electric power source in a transmission includes a transmission housing, and an electric machine including a rotor and a stator secured to the housing. A first member is secured to the rotor, extends radially toward an axis of rotation, and is formed with a first pilot surface. A second member, secured to the rotor and the housing, extends from the housing toward the axis and is formed with a second pilot surface that is aligned axially with the first pilot surface. An anti-friction bearing, located at an axial rearward side of a torque converter, is engaged with the first pilot surface and the second pilot surface.

The drive assembly is compact and has short axial length to facilitate its being packaged in the engine compartment of a motor vehicle. The assembly is functionally robust and easy to assemble.

The assembly provides a stiff structural path between the rotor and stator of the electric machine, which may be an integrated starter/generator (ISG), thereby maintaining the required small rotor-to-stator air gap, its nominal diametric dimension, and its positional and diametric tolerances. The torque converter and rotor are torsionally connected to the crankshaft through a radial spline at the transmission side of a torsion damper. This allows transmission of rotational power from the engine to the electric machine-transmission interface, without the bearing radially constraining the crankshaft. The rolling element of the bearings may be single row or double row ball, single or paired angular contact ball, roller or needle, or single or paired tapered roller bearings.

To further ensure the dimensional stability of the air gap, a second anti-friction bearing may be used on the side of the torque converter opposite the location of the electric machine. This second bearing further radially supports and locates the torque converter and rotor. The second bearing can be piloted to an oil pump body or directly to the transmission housing for an even stiffer and more tightly toleranced structural path.

A torsion damper having an input secured to the engine shaft and output secured to the rotor and impeller dampens torsional vibrations between the engine shaft and torque converter.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages will become readily apparent to those skilled in the art from the following detailed description of a preferred embodiment when considered in the light of the accompanying drawings in which.

DESCRIPTION OF THE PREFERRED EMBODIMENT

Figure 1:
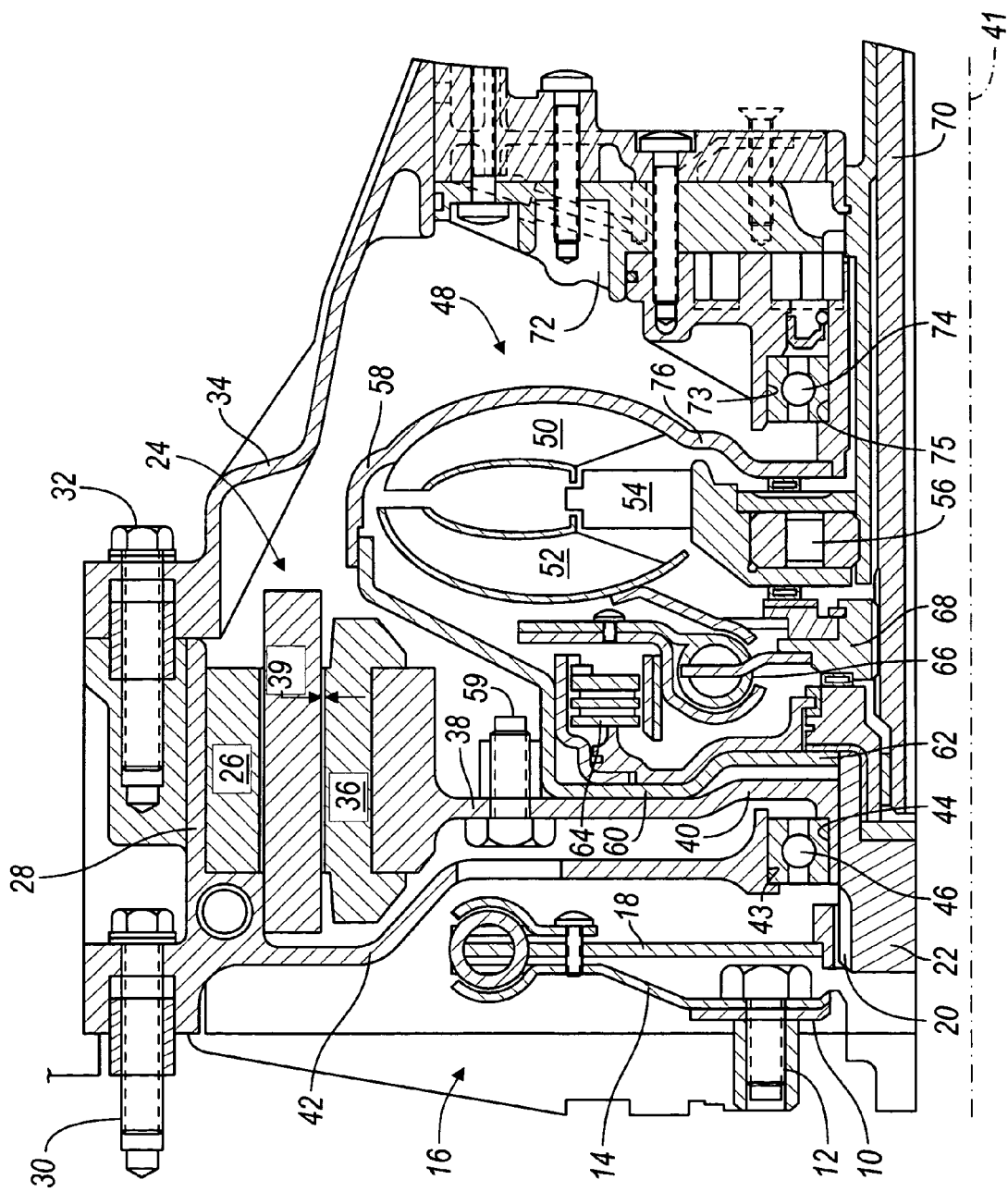
FIG. 1 is a cross section illustrating a first embodiment of a drive system apparatus.

Referring first to FIG. 1, a first power source, such as an internal combustion engine, includes an engine crankshaft 10, which is connected by bolts 12 and a flex plate 14 to a torsion damper 16, whose output 18 is driveably connected through a spline 20 to a shaft 22.

A second power source, an electric machine 24, includes a stator 26, secured to a housing 28, which is secured by bolt 30 to the engine rear face of an engine block, and by bolt 32 to a transmission housing 34. The electric machine 24 also includes a rotor 36, which is supported on a disc member 38 such that the radial outer surface of the rotor is spaced a short distance 39 from the radial inner surface of the stator 26. The rotor and other rotating components of the drive system apparatus rotate about an axis 41. The disc member 38 includes a hub 40, which is supported on and secured to shaft 22. The housing 28 of the electric machine 24 includes a stationary disc member 42, which is secured at its radial outer end by bolt 30 to the engine and is formed at its radial inner end with a pilot surface 43. The hub 40 of disc member 38 is also formed with a pilot surface 44. A first bearing 46, located at the axial forward side of torque converter 48, engages the pilot surfaces 43, 44 and supports shaft 22 and rotor 36 as they rotate about axis 41 on the transmission housing 34.

A torque converter 48 includes a bladed impeller wheel 50, a bladed turbine wheel 52, and a bladed stator wheel 54, which is supported on a one-way clutch 56. The torque converter 48 includes a casing 58, which encloses the impeller 50, turbine 52, and stator 54 and extends axially toward the disc member 38. A bolt 59 can be used to connect mutually the casing 58 and member 38, or they can be mutually secured at 60. The radial inner end of cover 58 is secured at 62 to shaft 22.

A bypass clutch 64 and torsion damper 66 are located within the torque converter case 58. The bypass clutch 64, which includes an input secured to the case 58 and an output secured to the turbine wheel 52 and damper 66, alternately opens and closes a drive connection between the case 58 and turbine wheel 52. When bypass clutch 64 is engaged, a direct mechanical connection between shaft 22 and a transmission input shaft 70 is produced, thereby bypassing the hydrokinetic connection produced by the torque converter 48 when clutch 64 is disengaged. The torsion damper 66 includes an output secured to a turbine wheel hub 68, which is splined to input shaft 70.

A pump body 72, secured to the transmission case 34, is formed with a third pilot surface 73. The hub 76 of the impeller case 58 is formed with a fourth pilot surface 75. A second bearing 74, located at the axial rearward side of torque converter 48, engages pilot surfaces 73, 75 and supports converter case 58 on the transmission housing 34 as it rotates about axis 41.

The kinematic assembly, hydraulic actuation system and electronic controls of an automatic transmission are located at the right-hand side, i.e., rearward, of the oil pump body 72.

Figure 2:
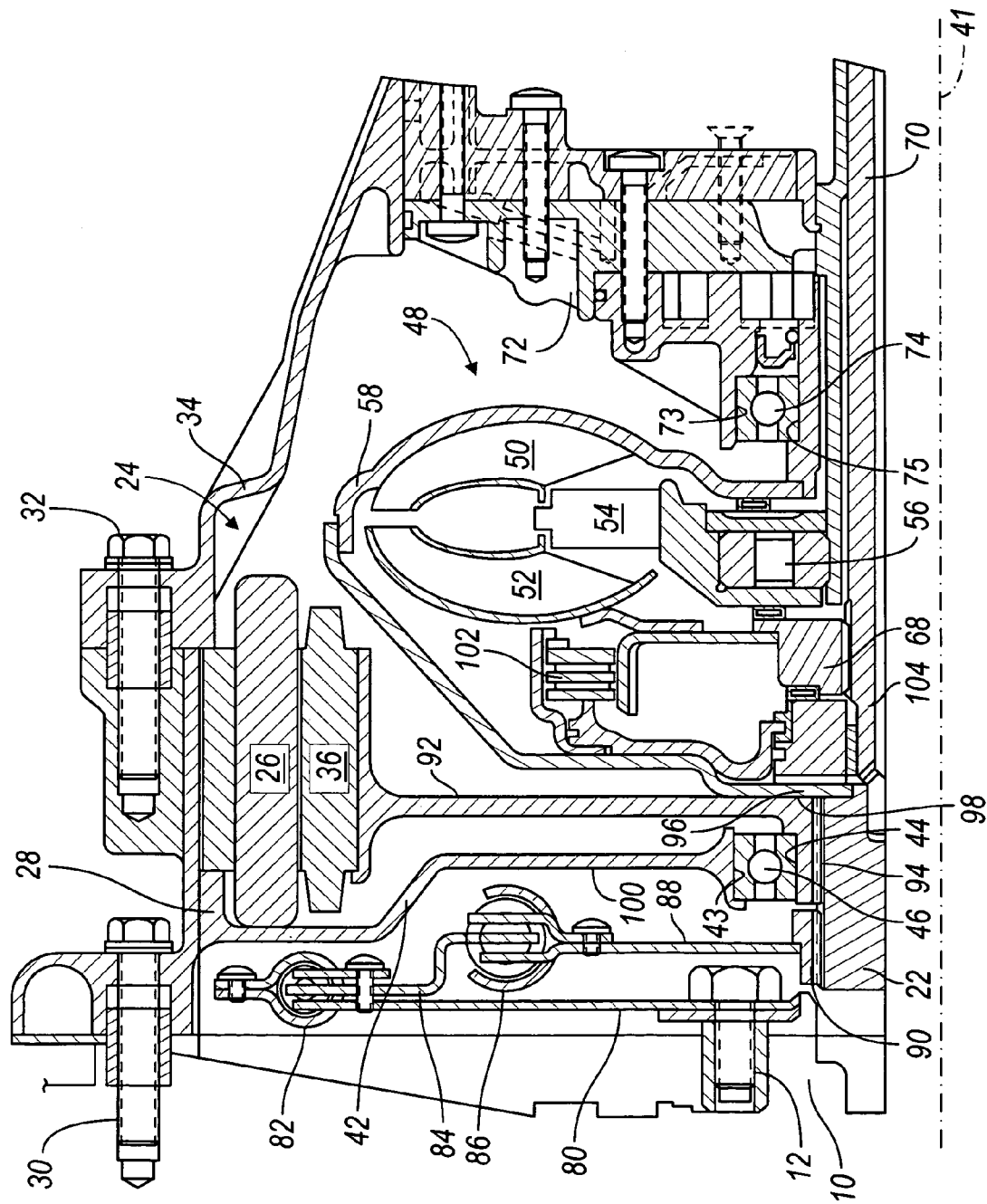
FIG. 2 is a cross section illustrating a second embodiment.

Referring now to FIG. 2, the engine crankshaft 10 is connected by bolt 12 to a flex plate 80, which extends radially to a first torsion damper 82. The output 84 of damper 82 is driveably connected to the input of a second torsion damper 86, which is supported on a hub 88, splined at 90 to shaft 22'.

The rotor 36 of the electric machine 24 includes a hub 92, which is torsionally connected at a spline 94 to shaft 22'. The impeller case 58 is secured at 96 to shaft 22' and at 96 to the hub 92. The housing 28 of the electric machine includes a disc member 42, which is formed at its radial inner end with a pilot surface 43. The hub 92 of the rotor 36 is also formed with a pilot surface 44. The first bearing 46, located at the axial forward side of torque converter 48, engages the pilot surfaces 43, 44 and supports shaft 22 and rotor 36 on the transmission housing 34 as they rotate about axis 41.

A bypass clutch 102 is arranged in parallel between the impeller case 58 and hub 68 on which the turbine wheel 52 is connected through a spline 104 to the transmission input shaft 70.

Figure 3:
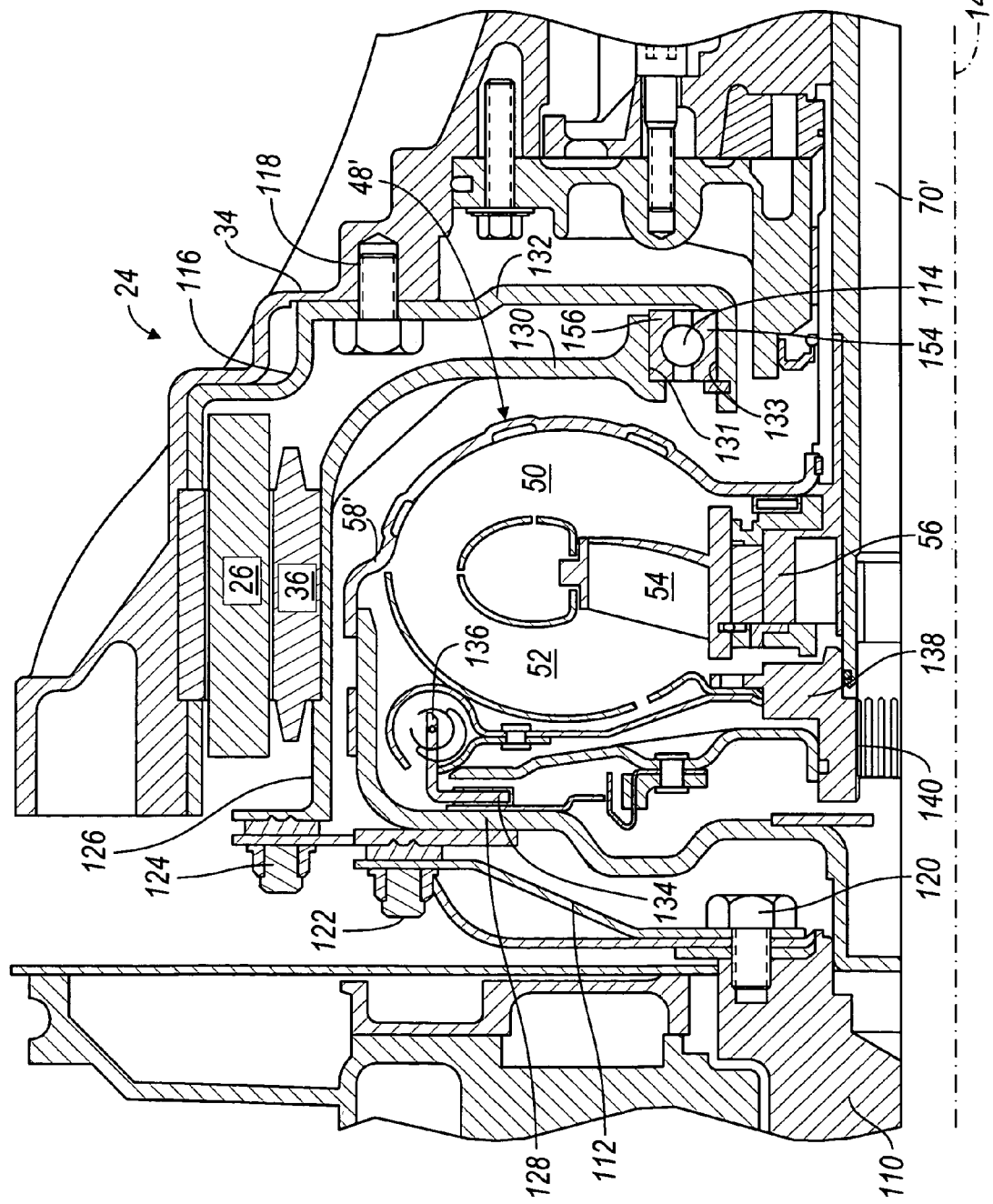
FIG. 3 is cross section illustrating a third embodiment.
Figure 4:
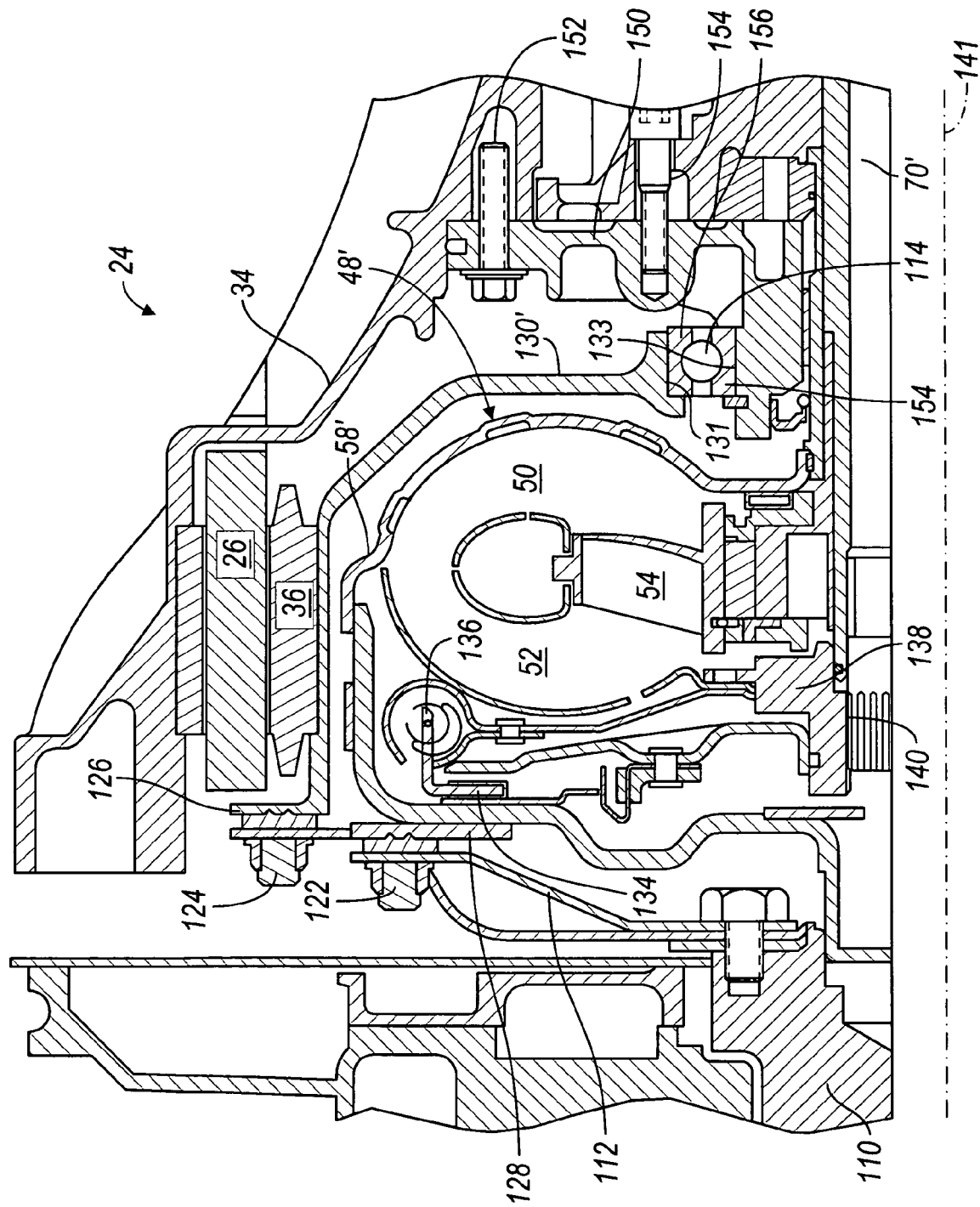
FIG. 4 is cross section illustrating a fourth embodiment.

In the embodiments of FIGS. 3 and 4, the rotor 36 and stator 26 of the electric machine 24 are aligned with the torque converter 48. The rotor 36 is supported by an engine crankshaft 110 through a flex plate 112, located at the front of the torque converter 48, and by an anti-friction bearing 114 at the rear front of the torque converter.

In the embodiment of FIG. 3, stator 26 is secured to an electric machine cover 116, which is connected by bolts 118 to the transmission housing 34. The engine crankshaft 110 is connected by bolts 120 to a flex plate 112, which is secured by a mechanical connection 122 to the impeller case 58' and by a mechanical connection 124 to a support member 126. The rotor 36 is secured to an axial portion of member 126, which extends radially toward axis 41 and terminates at a hub 130, which is formed at its radial inboard end with a pilot surface 131. The electric machine cover 116 contains a disc member 132, which is also formed with a pilot surface 133 facing pilot surface 131. A bearing 114, located at the axial rearward side of torque converter 48, engages pilot surfaces 131, 133 and supports the rotor 36 on the electric machine cover 116 as the rotor rotates about axis 41.

Crankshaft 110 is supported for rotation on a bearing (not shown) located in the engine block.

A bypass clutch 134 and torsion damper 136 are located within the torque converter case 58'. The bypass clutch 134 includes an input secured to the case 58' and an output secured to the hub 138 of the turbine wheel 52 and to damper 136. The bypass clutch 134 alternately opens and closes a drive connection between the impeller case 58' and turbine wheel 52. When bypass clutch 134 is engaged, a direct mechanical connection between crankshaft 110 and a transmission input shaft 70 is produced, thereby bypassing the hydrokinetic connection produced by the torque converter 48' when clutch 134 is disengaged. The torsion damper 136 includes an output secured to a turbine wheel hub 138, which is splined at 140 to input shaft 70'.

In the embodiment of FIG. 4, the transmission case 34 supports the stator 26, and a pump body 150 is secured by bolts 152, 154 to the transmission case 34. The pump body 150 is formed with pilot surface 133, which faces pilot surface 131, formed on member 130'. A bearing 114, located at the axial rearward side of torque converter 48, engages pilot surfaces 131, 133 and supports member 130' and rotor 36 on the pump housing 150 as they rotates about axis 41. The radial inner race 154 of the anti-friction bearing 114 engages pilot surface 133; the outer race 156 of bearing 114 engages pilot surface 131.

In accordance with the provisions of the patent statutes, the preferred embodiment has been described. However, it should be noted that the alternate embodiments can be practiced otherwise than as specifically illustrated and described.

What is claimed is:

1. An apparatus for supporting an electric power source in a vehicle transmission, comprising:
    a housing;
    an electric machine including a stator secured to the housing, and a rotor;
    a first member secured to and extending from the rotor toward an axis of rotation and including a first pilot surface;
    a second member secured to and extending from the housing toward the axis, and including a second pilot surface;
    a torque converter including a case driveably connected to the rotor and including a third pilot surface;
    a first bearing engaged with the first and second pilot surfaces;
    a pump body secured to the housing and including a fourth pilot surface;
    a second bearing engaged with the third and fourth pilot surfaces.

2. The apparatus of claim 1, further comprising:
    an internal combustion engine crankshaft; and
    a torsion damper including an input secured to the crankshaft and an output driveably connected to the first member and the casing.

3. The apparatus of claim 1, further comprising:
    an internal combustion engine crankshaft;
    a shaft aligned with the axis, formed with a first spline, and secured to the casing and first member; and
    a torsion damper having an input secured to the crankshaft and an output driveably connected by the first spline to the shaft.

4. The apparatus of claim 1, further comprising:
    an internal combustion engine crankshaft;
    a shaft aligned with the axis and secured to the casing, formed with a first spline and a second spline that driveably connects the shaft to the first member; and
    a torsion damper having an input secured to the crankshaft and an output driveably connected by the first spline to the shaft.

5. The apparatus of claim 1, further comprising:
an internal combustion engine crankshaft;
a shaft aligned with the axis and secured to the casing, formed with a first spline and a second spline that driveably connects the shaft to the first member; and
a first torsion damper including a first input secured to the crankshaft and a first output; and
a second torsion damper including a second input secured to the first output and a second output connected by the first spline to the shaft.

6. The apparatus of claim 1, wherein:
the transmission includes an input shaft; and
the torque converter further includes an impeller wheel secured to the impeller case, and a turbine wheel hydrokinetically coupled to the impeller wheel, the apparatus further comprises:
a bypass clutch including a third input secured to the case, and a third output secured to the turbine wheel, for alternately opening and closing a drive connection between the third input and third output; and
a third torsion damper including a fourth output secured to the input shaft, and fourth input secured to the third output and the case.

7. An apparatus for supporting an electric power source in a vehicle transmission, comprising:
an electric machine including a stator and a rotor;
a first member including a first portion extending axially and secured to the rotor along an radial inboard surface of the rotor, and including a second portion extending radially from the first portion toward an axis of rotation, and including a first pilot surface;
a second member secured to and extending from the rotor toward the axis, and including a second pilot surface;
a torque converter aligned radially with the rotor and stator; and
a bearing engaged with the first pilot surface and the second pilot surface.

8. The apparatus of claim 7, further comprising:
an internal combustion engine crankshaft located at an axial side of the torque converter, and secured to the impeller; and
a flex plate secured to the crankshaft and to the first member.

9. The apparatus of claim 7, wherein:
the transmission includes an input shaft; and the apparatus further comprises the torque converter further includes an impeller wheel secured to an impeller case, and a turbine wheel hydrokinetically coupled to the impeller wheel, the apparatus further comprises:
a bypass clutch including an input secured to the impeller case, and an output secured to the turbine wheel, for alternately opening and closing a drive connection between the input and the output; and
a torsion damper including a second output secured to the input shaft, and second input secured to the output and the impeller case.

10. An apparatus for supporting an electric power source in a vehicle transmission, comprising:
a housing;
an electric machine including a stator secured to the housing and a rotor;
a first member including a first portion extending axially and secured to the rotor along an radial inboard surface of the rotor, and a second portion extending radially from the first portion toward an axis of rotation and including a first pilot surface;
a pump body secured to the housing and including a second pilot surface;
a torque converter aligned radially with the rotor and stator;
a bearing engaged with the first and second pilot surfaces.

11. The apparatus of claim 10, further comprising:
an internal combustion engine crankshaft located at an axial forward side of the torque converter, and secured to the impeller; and
a flex plate secured to the crankshaft and to the first member at the axial forward side of the torque converter.

12. The apparatus of claim 10, wherein:
the transmission includes an input shaft; and
the torque converter further includes an impeller wheel secured to an impeller case, and a turbine wheel hydrokinetically coupled to the impeller wheel, and the apparatus further comprises:
a bypass clutch including an input secured to the impeller case, and an output secured to the turbine wheel, for alternately opening and closing a drive connection between the input and the output; and
a torsion damper including a second output secured to the input shaft, and second input secured to the output and the impeller case.

* * * * *